United States Patent

[11] 3,628,941

| [72] | Inventor | Alfred Finlay Marks<br>Trenton, N.J. |
|---|---|---|
| [21] | Appl. No. | 848,712 |
| [22] | Filed | Aug. 8, 1969 |
| [45] | Patented | Dec. 21, 1971 |
| [73] | Assignee | American Cyanamid Company<br>Stamford, Conn.<br>Continuation-in-part of application Ser. No. 604,164, Dec. 23, 1966, now abandoned. This application Aug. 8, 1969, Ser. No. 848,712 |

[54] ANTIMICROBIAL SOLUTIONS OF DODECYLGUANIDINE HYDROCHLORIDE HAVING LOW-TEMPERATURE STABILITY
2 Claims, No Drawings

| [52] | U.S. Cl. | 71/67, 424/358 |
|---|---|---|
| [51] | Int. Cl. | A01n 9/00 |
| [50] | Field of Search | 71/67; 424/326 |

[56] References Cited
UNITED STATES PATENTS

| 3,143,459 | 4/1964 | Marks et al. | 71/AD |
| 3,157,695 | 11/1964 | Lafont | 71/AD |
| 3,264,172 | 8/1966 | Regutti | 71/AD |

OTHER REFERENCES

Source Book of Industrial Solvent, Vol. III, pp. 252– 253 (1959).

Chemical Abstracts, Vol. 42, Col. 6964 (1948).

Soap & Sanitary Chemicals, Nov. 1945, pp. 110– 115 and 155

*Primary Examiner*—James O. Thomas, Jr.
*Attorney*—Lawrence W. Flynn

ABSTRACT: Antimicrobial compositions, typically a solution of dodecylguanidine hydrochloride in tetrahydrofurfuryl alcohol. The compositions are stable above or below 30° F. and are compatible and miscible with organophosphorus insecticides.

ANTIMICROBIAL SOLUTIONS OF DODECYLGUANIDINE HYDROCHLORIDE HAVING LOW-TEMPERATURE STABILITY

CROSS-REFERENCE TO RELATED APPLICATION

This is a continuation-in-part application of application Ser. No. 604,164 filed Dec. 23, 1966, now abandoned in the name of the present inventor.

BACKGROUND OF THE INVENTION

This invention relates to the field of antimicrobial compositions and methods of use, particularly for the control of the bacteria, fungi and algae which damage plants, such as agronomic crops, industrial systems, such as cooling towers, oil well equipment and cutting oils, and porous substrates such as textile materials and cellulose products.

Many of the mineral acid or monocarboxylic acid salts of alkyl guanidines are known for their antimicrobial activity as disclosed, for example, in U.S. Pat. Nos. 2,867,562, 2,906,595, 3,116,326, 3,142,615, 3,143,459 and 3,264,172. The acid salts of dodecylguanidine are probably the best known and widely used compounds of the class. Although the ensuing discussion is in terms of agricultural fields of use, it should be understood that the problems encountered therein relating to preparation, storage, handing and application of liquid formulations of the alkyl guanidine salts are common to other fields wherein antimicrobial solutions of the salts are employed and the invention has utility in such other environments.

In recent years the nonphytotoxic salts of dodecylguanidine have been employed by the agricultural industry for controlling bacteria and fungi which attack a large variety of living plants, trees, shrubs and the like. Control has been obtained by application of the active material in wettable powder or dust formulations to the foliage of the plants sought to be protected. Although such formulations are useful, serious problems persist. Thus, the wettable powders often require admixture with water or other inexpensive solvents. However, good mixture and compatibility with insecticides commonly employed therewith are difficult to attain and the formulations tend to clog spraying apparatus. These formulations are therefore not amenable to low-volume or ultra-low-volume application.

A liquid formulation which avoids these difficulties would therefore be highly desirable. However, attempts to prepare such formulations containing dodecylguanidine salts have, heretofore, failed to yield the desired product. Although some salts of dodecylguanidine are relatively soluble in water and other polar solvents at room temperature, i.e., about 70° F., unfortunately, almost all are insoluble at temperatures below about 30° F. Thus they come out of solution on standing at low temperature and do not readily redissolve on warming. Addition of low alkanols helps to increase solubility and reduce viscosity of these formulations, but the problem is not thereby completely resolved, particularly since an excessive amount of a lower alkanol reduces the flash point of the formulations to a point where a real danger of ignition exists.

SUMMARY OF THE INVENTION

The aforementioned problems are solved by a liquid antimicrobial composition containing as essential constituents dodecylguanidine, hydrogen chloride, and tetrahydrofurfuryl alcohol. These liquid compositions surprisingly not only are compatible and miscible with organophosphorus insecticides but also are stable at the lower temperatures commonly encountered in storage, handling and application. Moreover, the compositions do not clog mixing and application apparatus.

DESCRIPTION OF THE PREFERRED EMBODIMENTS

The most elementary composition of the invention is dodecylguanidine hydrochloride salt in sufficient tetrahydrofurfuryl alcohol to dissolve the salt. However, the hydrogen chloride may also be introduced as dilute or concentrated aqueous hydrochloric acid, or even as gaseous hydrogen chloride, into a mixture containing sufficient dodecylguanidine to form an acid salt with the hydrogen chloride and sufficient tetrahydrofurfuryl alcohol to dissolve the resulting acid salt. The dodecylguanidine may also be initially present as a mono- or polycarboxylic acid salt, such as dodecylguanidine acetate or phthalate, and the hydrogen chloride added as just described whereby the hydrochloride acid salt of dodecylguanidine is formed.

Consequently, sequence of admixture or initial form of the essential constituents are not critical and any order of addition or other admixture condition, such as temperature and relative proportions of ingredients, may be observed provided the final composition is liquid and stable under normal handling and storage conditions at lower temperatures, e.g., 30° F. or lower, as well as at normal ambient temperatures.

With respect to proportions of the essential ingredients, the amount of hydrogen chloride present may be in excess over the stoichiometric amount required to form the dodecylguanidine acid salt but great excesses are to be avoided since crystallization of the hydrochloride salt may be encountered thereby. Amounts of hydrogen chloride much less than stoichiometric likewise should be avoided since low-temperature stability is thereby lost. In this regard, clear solutions having satisfactory low-temperature stability are produced when the mole ratio of hydrogen chloride to dodecylguanidine is maintained in the range of from about 0.6 to about 2.0 and preferably from about 0.8 to 1.5. In a typical solution, the mole ratio of hydrogen chloride to dodecylguanidine is about 1.0.

As discussed heretofore, the invention in its most basic aspects comprises a solution of dodecylguanidine hydrochloride in tetrahydrofurfuryl alcohol which exhibits remarkable and unexpected stability at low temperatures. However, this basic solution can be further diluted with a wide variety of inert polar solvents without substantial adverse effect upon the low-temperature stability of the solution as is, in fact, amply shown by the data provided in Examples 4 and 5 hereinbelow. Among the polar solvents which can be employed for this purpose are water; the lower alkanols such as methanol, ethanol, n-propanol, isopropanol, and butanol; cyclic alcohols such as cyclohexanol, straight chain and cyclic ketones such as methyl isobutyl ketone; acetophenone, mesityl oxide, diacetone alcohol, and cyclohexanone; pyrrolidones such as N-methyl-2-pyrrolidone; glycol ethers such as diethyleneglycol ethylether (carbitol), glycol ethyl ether (cellosolve), ethyleneglycol monomethylether (methyl cellosolve); polyglycols such as polyethylene glycol and polypropylene glycol; and carbinols such as phenyl methyl carbinol. Various mixtures of two or more of the above polar solvents can also be employed as diluents.

Preferred polar solvents for use as diluents include water, lower alkanols, cyclohexanol, cyclohexanone, methyl isobutyl ketone, mesityl oxide, cellosolve, methyl cellosolve, and N-methyl-2-pyrrolidone.

For optimum low-temperature stability, the preferred compositions comprise from about 10 percent to about 25 percent by weight of dodecylguanidine, from about 1.3 percent to about 4.2 percent by weight of hydrogen chloride (real basis), from about 15 percent to about 60 percent by weight of tetrahydrofurfuryl alcohol, and sufficient water, a lower alkanol, or mixture thereof, to make up 100 percent by weight.

Optionally, other ingredients may be added to the composition provided they do not substantially detract from the stability and activity of the composition. For example, it is sometimes advantageous to add a cationic or nonionic surfactant, or mixture of the two, to enhance compatibility with other additives such as organophosphorus insecticides or to improve penetrability of the composition. Typical surfactants are "Ethomeen S/25," an ethylene oxide condensate of primary fatty amines, and "Aerosol C-61," an ethanolated alkyl guanidineamine complex. However, in the case of organophosphorus insecticide additives, it will generally be desirable to minimize the amount of water in the composition since such additives tend to be hydrophobic and therefore detract from miscibility and compatibility.

The following examples further illustrate the invention but are not limitative thereof except as indicated in the appended claims. All parts and percentages are by weight unless otherwise specified.

EXAMPLE 1

Table 1 shows two formulations, A and B, illustration the lower and upper limits of the preferred formulation ranges. THFA is tetrahydrofurfuryl alcohol. The balance of the composition, to make up 100 percent, in each case is water, a lower alkanol, or mixture of the two.

TABLE I

| Essential Constituent | A Formulation based on Dodecylguanidine Acetate (DDGA) | B Formulation based on Dodecylguanidine Hydrochloride (DDGH) |
|---|---|---|
| 10%-dodecylguanidine | 12.6%-DDGA | 11.7%-DDGH |
| 1.3%-HCl (real) | 3.5%-37% HCl | |
| 15%-THFA | 15%-THFA | 15%-THFA |
| 25%-dodecylguanidine | 31.6%-DDGA | 29%-DDGH |
| 4.2%-HCl (real) | 11.5%-37% HCl | |
| 60%-THFA | 60%-THFA | 60%-THFA |

In practice the formulations of the invention may be applied low volume, i.e., without further dilution, directly to the foliage of plants or they may be diluted with water or other inexpensive polar solvent and applied to the foliage as a dilute spray. Low volume application is generally accomplished with aerial equipment applying about 2 pints to 1 gallon per acre of formulation. For conventional spraying, 2 pints to 1 gallon of formulation may be diluted with as much as 100 to 200 gallons of water and the diluted solution is then applied at the rate of as much as 200 gallons per acre.

Insecticides such as O,O-dimethyl phosphordithioate of diethyl mercaptosuccinate; O,O-dimethyl S-(N-methylcarbamolymethyl) phosphorodithioate; 0,0-dimethyl O-p-nitrophenyl phosphotothioate; or 0,0-dimethyl O-2-chloro-4-nitrophenyl phosphorothioate may be admixed with the formulations and the mixture then applied to the foliage to provide simultaneous insecticidal, fungicidal and bactericidal control.

EXAMPLE 2

Low-temperature Stability of Dodecylguanidine Hydrochloride-Tetrahydrofurfuryl Alcohol System The low-temperature stability of the formulations of the invention are demonstrated by the following tests wherein 1 gram of dodecylguanidine hydrochloride (DDGH) was separately admixed with 4 milliliters each of tetrahydrofurfuryl alcohol, furfuryl alcohol, 2-furaldehyde, and methyl cellosolve and solubility of the dodecylguanidine hydrochloride in the solvents determined at various temperatures. From the results reported in table II below, where S means soluble and I means insoluble, it is dramatically evident that the tetrahydrofurfuryl alcoholdodecylguanidine hydrochloride system is unique and vastly superior to the most closely related systems with which it might be compared.

TABLE II

| Solvent | Solubility [2] | | | | | | |
|---|---|---|---|---|---|---|---|
| | RT [1] | 0°F | 10°F | 15°F | 20°F | 25°F | 45°F |
| Tetrahydrofurfuryl alcohol | S | S | S | S | S | S | S |
| Furfuryl alcohol | S | I | I | I | I | I | Cloudy [3] |
| 2-Furaldehyde | I | — | — | — | — | — | — |
| Methyl cellosolve | S | I | I | I | Partially S | S | S |

[1] Room temperature (about 68°F).
[2] All samples were seeded at 0°F with DDGH.
[3] Cleared at 45°C after 5 minutes stirring.

EXAMPLE 3

Low Temperature Stability of Dodecylguanidine Hydrochloride in Various Solvents

Dodecylguanidine acetate, 29.0 grams, is dissolved in 75 milliliters of hot isopropanol to which is added 10.5 grams of 37 percent hydrochloric acid. After solution is achieved, 100 milliliters of toluene is added and the mixture is evaporated under reduced pressure at 35° C. One hundred milliliters of toluene is then added to the residue and the mixture is again evaporated. The residue is again mixed with 100 milliliters of hot toluene, then cooled to room temperature and filtered. Dodecylguanidine hydrochloride, 26.7 grams, is recovered. One gram samples of the prepared hydrochloride are then admixed at room temperature with 4 milliliters of various solvents and solubility of the composition in the solvent noted. The prepared mixtures are then stored for 2 hours at 20° and −20° F. and solubility noted. The results are reported in table III below where S means soluble and I means insoluble. The unusual low temperature (−20° F.) stability of the dodecylguanidine hydrochloride/tetrahydrofurfuryl alcohol composition is dramatically demonstrated.

TABLE III

| Solvent | RT [1] | 20°F. | −20°F |
|---|---|---|---|
| Cyclohexanone | I | — | — |
| n-Propanol | S | I | I |
| Propylene glycol | S | I | I |
| Polypropylene glycol 150 | slowly S | I | I |
| Propylene carbonate | I | — | — |
| n-Methyl-2-pyrrolidone | S | sl. cloudy | sl. cloudy |
| "Cellosolve" content | S | I | I |
| "Cellosolve" acetate | I | — | — |
| Methyl "Cellosolve" | S | I | I |
| "Carbitol" solvent | S | I | I |
| "Carbitol" acetate | I | — | — |
| Methyl isobutyl ketone | I | — | — |
| Butyrolactone | I | — | — |
| Phenylmethyl carbinol | S | I | — |
| Cyclohexanol | almost S | I | I |
| Tetrahydrofurfuryl alcohol | S | S | S |
| n-Butanol | S | I | I |
| Nitromethane | I | — | — |
| Methyl isobutyl carbinol | almost S | I | I |
| "Pent-oxal" | I | — | — |
| Diacetone alcohol | almost S | I | I |
| 1,4-Butanediol | almost S | I | I |
| Methyl "Cellosolve" — methyl alcohol mix | S | S | I |

[1] Room temperature (about 68° F.).

EXAMPLE 4

This example illustrates the continuing low-temperature stability of solutions of dodecylguanidine hydrochloride in tetrahydrofurfuryl alcohol even after they have been diluted with a variety of inert polar solvents.

A solution was prepared by mixing together 25.5 parts (by weight in all cases) dodecylguanidine acetate (97.7 percent tech.), 47.1 parts tetrahydrofurfuryl alcohol, and 8.2 parts of 36 percent aqueous hydrochloric acid. To the clear solution were then added 19.2 parts of a selected polar solvent as a diluent. The solution thus prepared was seeded overnight and was then stored in a refrigerator for 1 week at a temperature of 14° F. whereupon the observations presented below were made.

| Polar Solvent Used | Observation (14° F.) |
|---|---|
| 3A-alcohol (86% ethanol) | No crystals |
| cyclohexanone | No crystals |
| cyclohexanol | No crystals |
| propylene glycol 150 | No crystals |
| methyl cellosolve | No crystals |
| cellosolve | No crystals |
| N-methyl-2-pyrrolidone | No crystals |
| phenyl methyl carbinol | No crystals |
| carbitol | No crystals |
| methyl isobutyl ketone | No crystals |
| diacetone alcohol | No crystals |

| | |
|---|---|
| propylene glycol | No crystals |
| acetophenone | No crystals |

The above results clearly show that the solutions of dodecylguanidine hydrochloride in tetrahydrofurfuryl alcohol can be readily diluted with a vast number of polar solvents without adverse effect upon the unusual low-temperature stability of the solutions.

EXAMPLE 5

This example illustrates the continuing low-temperature stability of solutions of dodecylguanidine hydrochloride in tetrahydrofurfuryl alcohol even after they have been diluted with a mixture of two inert polar solvents, one of the solvents always being water and the other being selected from a variety of organic polar solvents.

A solution was prepared by mixing together 25.2 parts (by weight in all cases) dodecylguanidine acetate (97.7 percent tech.) 47.1 parts tetrahydrofurfuryl alcohol, and 8.2 parts of 36 percent aqueous hydrochloric acid. To the clear solution were then added 7.0 parts of deionized water and 12.5 parts of the selected organic polar solvent as diluent. The solution thus prepared was seeded overnight and was then stored in a refrigerator for 2 week at a temperature of 26° F. whereupon the observations presented below were made:

| Polar Solvent Used | Observation at 26° F. |
|---|---|
| 31 (86% ethanol) | No crystals |
| methyl isobutyl ketone | No crystals |
| cyclohexanone | No crystals |
| methyl cellosolve | No crystals |

EXAMPLE 6

A variety of formulations as shown below were prepared and stored in a refrigerator for 5 days at a temperature of 26° F. In all cases, the solutions were clear and contained no crystals at the end of the storage period. All parts are by weight

| Ingredient | Formula 1 | Formula 2 | Formula 3 | Formula 4 |
|---|---|---|---|---|
| dodecylguanidine * | * 18.5 | * 18.5 | * 18.5 | * 18.5 |
| 36% aqueous hydrochloric acid | 12.4 | 16.4 | 6.0 | 5.0 |
| water | 2.0 | — | 7.0 | — |
| 3A-alcohol (86% ethanol) | 12.5 | 12.0 | 12.5 | 12.0 |
| tetrahydrofurfuryl alcohol | 47.3 | 45.8 | 48.7 | 57.2 |

* added as 25.8 parts of docecylguanidine acetate (95.5% tech)

EXAMPLE 7

Dodecylguanidine Hydrochloride Formulation and Control of Pecan Scab Therewith

Dodecylguanidine acetate, 25.5 parts, is dissolved in 47.0 parts of tetrahydrofurfuryl alcohol, 12.3 parts of anhydrous ethanol, 8.2 parts of 36 percent hydrochloric acid, and 7.0 parts of water to yield a liquid formulation which is stable below 20° F. and highly effective for controlling pecan scab.

To determine the efficacy of this formulation against pecan scab (causative agent, *Eusicladium effusum*), mature pecan trees (Success and Stuart varieties) having a history of heavy incidence of scab were sprayed with the above formulation. Application was made with aerial equipment at about 3-week intervals over a 4-month period. The formulation was applied low volume (i.e., undiluted) at the rate of 1 gallon of formulation per acre. Periodically, the trees were examined for scab infestation and results recorded. Untreated trees were used as controls. On termination of the tests, trees treated with the above formulation were found to have little incidence of scab and practical control was achieved. The untreated trees had a heavy incidence of scab and the fruit was not satisfactory for marketing.

In similar tests the above formulation was admixed with technical grade O,O-dimethyl phosphorodithioate of diethyl mercaptosuccinate insecticide in an 8 to 1 ratio of formulation to insecticide. The admixture was applied to mature pecan trees at the rate of 1.25 gallons of mixture per acre of trees. Applications were made in accordance with the above schedule and practical scab control was obtained. In addition, it was noted that the trees were essentially free of insect injury normally observed in untreated pecans. The excellent miscibility, as well as compatibility, of the insecticide is an unexpected advantage.

In general, compositions comprising from about 20 to 30 parts of dodecylguanidine acetate, from about 42 to 52 parts of tetrahydrofurfuryl alcohol, from about 7 to 17 parts of a lower alkanol, from about 3 to 13 parts of concentrated hydrochloric acid, and from about 2 to 12 parts of water have been found to be satisfactory.

EXAMPLE 8

Dodecylguanidine Hydrochloride Formulation and Control of Scab on Apple and Pear Trees The following formulation was prepared by dissolving dodecylguanidine acetate in a solution of tetrahydrofurfuryl alcohol, an ethylene oxide condensation product of primary fatty amines (Ethomeen C/25), 37 percent hydrochloric acid, and anhydrous ethanol:

| | |
|---|---|
| 20.2 | dodecylguanide acetate |
| 40.0 | tetrahydrofurfuryl alcohol |
| 3.0 | Ethomeen C/25 |
| 7.3 | 37% hydrochloric acid |
| 29.7 | anhydrous ethanol |

To determine efficacy of this formulation for controlling apple and pear scab, orchards were sprayed with dilute solutions of the formulation. Applications were at the rates (Imperial measure) of 1.5 pints in 100 gallons of water per acre and 2.5 pints of formulation in 200 gallons of water per acre treated employing conventional ground equipment. Four applications were made at 3 to 4 week intervals throughout the growing season. As a control, a portion of each orchard was treated with "CYPREX 65-W" fruit fungicide (a commercial wettable powder formulation of dodecylguanidine acetate) at the rate of one-half pound active ingredient per acre in 100 gallons of water. Periodically and on termination of the tests, trees and fruit were examined for scab. One hundred percent control was recorded for both rates tested and for the controls. Surprisingly, however, it was observed that the fruit treated with test formulations had finishes superior to the controls. Additionally, it was noted that trees treated with the test formulation appeared to have strengthened Gloeosporium control. Causative agents for apple scab and pear scab are *Venturia inaequalis* and *Venturia pyrina*, respectively.

EXAMPLE 9

Compatibility With Insecticides

Dodecylguanidine acetate, 21.8 grams, is dissolved in a 41.5 gram mixture of 7.6 grams of 37 percent hydrochloric acid, 24 grams of isopropanol, and 3.1 grams of "Ethomeen C/25." When stored at 17° F. for prolonged periods, the mixture remains clear and free flowing. No crystallization is noted.

Thereafter, 0.4 gram samples of this formulation are dispersed in 200 milliliter portions of water containing 250 p.p.m. of $MgCO_3$ and 50 p.p.m. $So_4$ ion. To the prepared samples are added 0.2 milliliters of O,O-diethyl O-2(ethylthio)ethyl phosphorothioate emulsifiable concentrate or 0.48 grams of 2,2-bis(p-chlorophenyl)-1,1,1-trichloroethane wettable powder and the mixtures are stored at room temperature for 16 days. All samples thus prepared are examined and found to be compatible. This test demonstrates compatibility of the compositions of the invention with insecticides and with anion-hard water.

I claim:

1. A method for protecting an environment of living plants against infection from bacteria, fungi, and algae which comprises applying to said environment a quantity sufficient to control said infection therein a solution, stable at low temperature, which comprises from about 10 to 25 percent by weight of dodecylguanidine, from about 1.3 to 4.2 percent by weight of hydrogen chloride, from about 15 to 60 percent by weight of tetrahydrofurfuryl alcohol, and sufficient polar solvent other than said tetrahydrofurfuryl alcohol to make 100 percent by weight total composition.

2. The method of claim 1 wherein the quantity of solution applied to said environment ranges from about 2 pints to about 1 gallon per acre.